US011510067B2

(12) United States Patent
Tang

(10) Patent No.: US 11,510,067 B2
(45) Date of Patent: Nov. 22, 2022

(54) UPLINK SIGNAL TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 32 days.

(21) Appl. No.: 17/129,639

(22) Filed: Dec. 21, 2020

(65) Prior Publication Data

US 2021/0112421 A1    Apr. 15, 2021

Related U.S. Application Data

(63) Continuation of application No. PCT/CN2019/086827, filed on May 14, 2019.

(30) Foreign Application Priority Data

Jun. 26, 2018   (CN) .......................... 201810671335.4

(51) Int. Cl.
*H04W 4/00*      (2018.01)
*H04W 16/14*     (2009.01)
(Continued)

(52) U.S. Cl.
CPC ........... *H04W 16/14* (2013.01); *H04L 1/0068* (2013.01); *H04L 1/1819* (2013.01);
(Continued)

(58) Field of Classification Search
None
See application file for complete search history.

(56) References Cited

U.S. PATENT DOCUMENTS

2014/0286255 A1*  9/2014  Nam .................... H04L 27/2636
                                                                370/329
2018/0132269 A1   5/2018  Wang et al.
(Continued)

FOREIGN PATENT DOCUMENTS

CN   106211337 A   12/2016
CN   106304100 A   1/2017
(Continued)

OTHER PUBLICATIONS

Guangdong OPPO Mobile Telecommunications Corp. Ltd., Extended European Search Report, EP19827473.0, dated Jul. 1, 2021, 8 pgs.
(Continued)

*Primary Examiner* — Zewdu A Beyen
(74) *Attorney, Agent, or Firm* — Morgan, Lewis & Bockius LLP

(57) ABSTRACT

An uplink signal transmission method, a terminal device, and a network device, capable of realizing correct transmission, on an unlicensed spectrum, of an uplink demodulation signal used for demodulating an uplink channel. The method comprises: on the first time unit of an unlicensed spectrum, a terminal device transmits a first demodulation signal and uplink data that is obtained by a first transmission block by means of rate matching, wherein the first demodulation signal is used for demodulating the uplink data; the symbols occupied by the first demodulation signal do not comprise a first symbol, and the first symbol comprises at least one of a first symbol in the first time unit and a last symbol in the first time unit.

16 Claims, 7 Drawing Sheets

(51) Int. Cl.
     *H04W 76/27*   (2018.01)
     *H04L 1/00*    (2006.01)
     *H04L 1/18*    (2006.01)
     *H04W 72/04*   (2009.01)

(52) U.S. Cl.
     CPC ... *H04W 72/0413* (2013.01); *H04W 72/0446* (2013.01); *H04W 76/27* (2018.02)

(56) References Cited

U.S. PATENT DOCUMENTS

2018/0167932 A1      6/2018  Papasakellariou
2018/0309552 A1 *   10/2018  Akkarakaran ...... H04L 27/2613

FOREIGN PATENT DOCUMENTS

| CN | 106452704 A | 2/2017 |
| CN | 108023671 A | 5/2018 |
| WO | WO2016048227 A2 | 3/2016 |
| WO | WO2016122122 A1 | 8/2016 |
| WO | WO2017120542 A1 | 7/2017 |
| WO | WO2020/001183 A1 | 1/2020 |

OTHER PUBLICATIONS

Guangdong OPPO Mobile Telecommunications Corp. Ltd., International Search Report and Written Opinion, PCT/CN2019/086827, dated Aug. 7, 2019, 12 pgs.

* cited by examiner

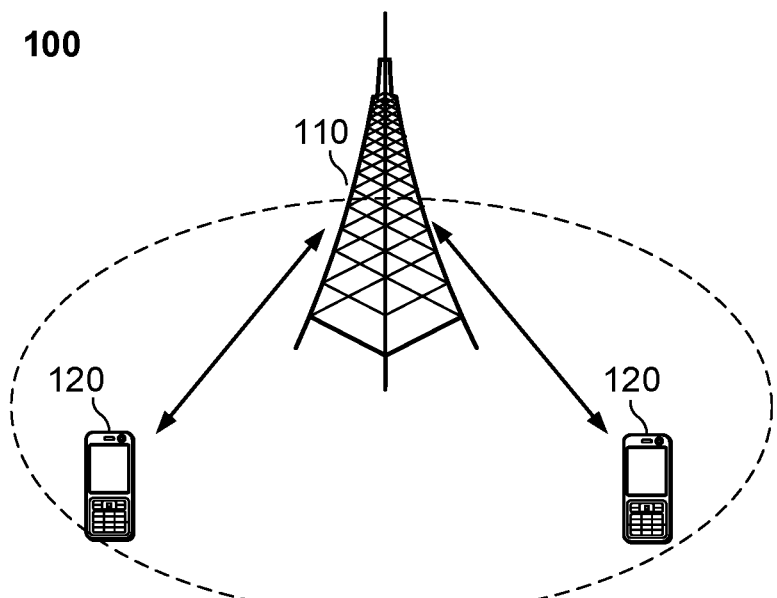

Transmitting, by a terminal device, a first demodulation signal and uplink data that is obtained by rate matching of a first transmission block to a network device on a first time unit of an unlicensed spectrum, wherein the first demodulation signal is used for demodulating the uplink data, and symbols occupied by the first demodulation signal do not include a first symbol; wherein the first symbol includes at least one of a first one of the symbols in the first time unit and a last one of the symbols in the first time unit ⟵ 210

FIG. 2A

| 0 | | | 10 | 20 | 30 | 40 | 50 | 60 | 70 | 80 | 90 | 100 | 110 |
|---|---|---|----|----|----|----|----|----|----|----|----|-----|-----|
| 1 | | | 11 | 21 | 31 | 41 | 51 | 61 | 71 | 81 | 91 | 101 | 111 |
| 2 | | | 12 | 22 | 32 | 42 | 52 | 62 | 72 | 82 | 92 | 102 | 112 |
| 3 | | | 13 | 23 | 33 | 43 | 53 | 63 | 73 | 83 | 93 | 103 | 113 |
| 4 | | | 14 | 24 | 34 | 44 | 54 | 64 | 74 | 84 | 94 | 104 | 114 |
| 5 | | | 15 | 25 | 35 | 45 | 55 | 65 | 75 | 85 | 95 | 105 | 115 |
| 6 | | | 16 | 26 | 36 | 46 | 56 | 66 | 76 | 86 | 96 | 106 | 116 |
| 7 | | | 17 | 27 | 37 | 47 | 57 | 67 | 77 | 87 | 97 | 107 | 114 |
| 8 | | | 18 | 28 | 38 | 48 | 58 | 68 | 78 | 88 | 98 | 108 | 118 |
| 9 | | | 19 | 29 | 39 | 49 | 59 | 69 | 79 | 89 | 99 | 109 | 119 |
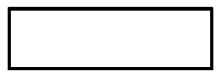 Uplink Data
 First Demodulation Signal
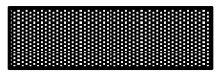 Second Demodulation Signal
FIG. 2F
| | | 0 | 10 | 20 | 30 | 40 | 50 | 60 | 70 | 80 | 90 | 100 |
|---|---|---|----|----|----|----|----|----|----|----|----|-----|
| | | 1 | 11 | 21 | 31 | 41 | 51 | 61 | 71 | 81 | 91 | 101 |
| | | 2 | 12 | 22 | 32 | 42 | 52 | 62 | 72 | 82 | 92 | 102 |
| | | 3 | 13 | 23 | 33 | 43 | 53 | 63 | 73 | 83 | 93 | 103 |
| | | 4 | 14 | 24 | 34 | 44 | 54 | 64 | 74 | 84 | 94 | 104 |
| | | 5 | 15 | 25 | 35 | 45 | 55 | 65 | 75 | 85 | 95 | 105 |
| | | 6 | 16 | 26 | 36 | 46 | 56 | 66 | 76 | 86 | 96 | 106 |
| | | 7 | 17 | 27 | 37 | 47 | 57 | 67 | 77 | 87 | 97 | 107 |
| | | 8 | 18 | 28 | 38 | 48 | 58 | 68 | 78 | 88 | 98 | 108 |
| | | 9 | 19 | 29 | 39 | 49 | 59 | 69 | 79 | 89 | 99 | 109 |
 Uplink Data
 First Demodulation Signal
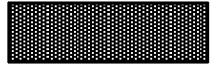 Second Demodulation Signal
FIG. 2G

| 110 | | | 0 | 10 | 20 | 30 | 40 | 50 | 60 | 70 | 80 | 90 | 100 |
| 111 | | | 1 | 11 | 21 | 31 | 41 | 51 | 61 | 71 | 81 | 91 | 101 |
| 112 | | | 2 | 12 | 22 | 32 | 42 | 52 | 62 | 72 | 82 | 92 | 102 |
| 113 | | | 3 | 13 | 23 | 33 | 43 | 53 | 63 | 73 | 83 | 93 | 103 |
| 114 | | | 4 | 14 | 24 | 34 | 44 | 54 | 64 | 74 | 84 | 94 | 104 |
| 115 | | | 5 | 15 | 25 | 35 | 45 | 55 | 65 | 75 | 85 | 95 | 105 |
| 116 | | | 6 | 16 | 26 | 36 | 46 | 56 | 66 | 76 | 86 | 96 | 106 |
| 114 | | | 7 | 17 | 27 | 37 | 47 | 57 | 67 | 77 | 87 | 97 | 107 |
| 118 | | | 8 | 18 | 28 | 38 | 48 | 58 | 68 | 78 | 88 | 98 | 108 |
| 119 | | | 9 | 19 | 29 | 39 | 49 | 59 | 69 | 79 | 89 | 99 | 109 |

 Uplink Data

 First Demodulation Signal

 Second Demodulation Signal

310 — Receiving, by a network device, a first demodulation signal and uplink data that is obtained by rate matching of a first transmission block transmitted by a terminal device on a first time unit of an unlicensed spectrum, wherein the first demodulation signal is used for demodulating the uplink data, and symbols occupied by the first demodulation signal do not include a first symbol; wherein the first symbol includes at least one of a first one of the symbols in the first time unit and a last one of the symbols in the first time unit

FIG. 3

UPLINK SIGNAL TRANSMISSION METHOD, TERMINAL DEVICE, AND NETWORK DEVICE

CROSS-REFERENCE TO RELATED APPLICATIONS

This application is a continuation application of PCT Patent Application No. PCT/CN2019/086827, entitled "UPLINK SIGNAL TRANSMISSION METHOD, TERMINAL DEVICE, AND NETWORK DEVICE" filed on May 14, 2019, which claims priority to Chinese Patent Application No. 201810671335.4, filed with the State Intellectual Property Office of the People's Republic of China on Jun. 26, 2018, and entitled "UPLINK SIGNAL TRANSMISSION METHOD, TERMINAL DEVICE, AND NETWORK DEN/ICE", all of which are incorporated herein by reference in their entirety.

TECHNICAL FIELD

Embodiments of the present application relate to the field of communication technologies, and in particular, to an uplink signal transmission method, terminal device, and network device.

BACKGROUND

In new radio (NR) systems such as 5G applications, an unlicensed spectrum can be used, that is, NR technologies are used for communication on a channel of the unlicensed spectrum. In order to allow individual wireless communication systems that use the unlicensed spectrum for wireless communication to coexist amicably on this spectrum, some countries or regions have stipulated legal requirements that must be met when the unlicensed spectrum is used. For example, in European regions, a communication device follow a "listen-before-talk (LBT)" principle, that is, the communication device is required to perform channel interception on the channel of the unlicensed spectrum before transmitting a signal on the channel of the unlicensed spectrum. Only when an outcome of the channel interception is that the channel is idle, the communication device can transmit the signal, and if the outcome of the channel interception is that the channel is busy, the communication device cannot transmit the signal.

SUMMARY

Embodiments of the present application provide an uplink signal transmission method, a terminal device, and a network device.

In a first aspect, there is provided an uplink signal transmission method, including:

transmitting, by a terminal device, a first demodulation signal and uplink data that is obtained by rate matching of a first transmission block to a network device on a first time unit of an unlicensed spectrum, wherein the first demodulation signal is used for demodulating the uplink data, and symbols occupied by the first demodulation signal do not include a first symbol;

wherein the first symbol includes at least one of a first one of the symbols in the first time unit and a last one of the symbols in the first time unit.

In a second aspect, there is provided another uplink signal transmission method, including:

receiving, by a network device, a first demodulation signal and uplink data that is obtained by rate matching of a first transmission block transmitted by a terminal device on a first time unit of an unlicensed spectrum, wherein the first demodulation signal is used for demodulating the uplink data, and symbols occupied by the first demodulation signal do not include a first symbol;

wherein the first symbol includes at least one of a first one of the symbols in the first time unit and a last one of the symbols in the first time unit.

In a third aspect, there is provided a terminal device, configured to perform the method in the first aspect or in any implementation thereof mentioned above.

Specifically, the terminal device includes functional modules configured to perform the method in the first aspect or in any implementation thereof mentioned above.

In a fourth aspect, there is provided a network device, configured to perform the method in the second aspect or in any implementation thereof mentioned above.

Specifically, the network device includes functional modules configured to perform the method in the second aspect or in any implementation thereof mentioned above.

In a fifth aspect, there is provided a communication device, including a processor and a memory. The memory is configured to store a computer program, and the processor is configured to call and run the computer program stored in the memory to execute the method in any one of the first to second aspects or any of the implementations thereof mentioned above.

In a sixth aspect, there is provided a chip, configured to perform the method in the first aspect or in any implementation thereof mentioned above.

Specifically, the chip includes: a processor, configured to call and run a computer program from a memory, so that a device installed with the chip performs the method in any one of the first to second aspects or any of the implementations thereof mentioned above.

In a seventh aspect, there is provided a computer-readable storage medium, configured to store a computer program that causes a computer to perform the method in any one of the first to second aspects or any of the implementations thereof mentioned above.

In to an eighth aspect, there is provided a computer program product, including computer program instructions, which cause the computer to perform the method in any one of the first to second aspects or any of the implementations thereof mentioned above.

In a ninth aspect, there is provided a computer program which, when run on a computer, causes the computer to perform the method in any one of the first to second aspects or any of the implementations thereof mentioned above.

BRIEF DESCRIPTION OF THE DRAWINGS

FIG. 1 is a schematic diagram of a communication system architecture provided by an embodiment of the present application.

FIG. 2A is a schematic diagram of an uplink signal transmission method provided by an embodiment of the present application.

FIG. 2F is a schematic diagram of a mapping of a first demodulation signal, a second demodulation signal, and uplink data in the embodiment corresponding to FIG. 2A;

FIG. 2G is a schematic diagram of a mapping of a first demodulation signal, a second demodulation signal, and uplink data in the embodiment corresponding to FIG. 2A;

FIG. 2H is a schematic diagram of a mapping of a first demodulation signal, a second demodulation signal, and uplink data in the embodiment corresponding to FIG. 2A;

FIG. 3 is a schematic diagram of another uplink signal transmission method provided by an embodiment of the present application.

DETAILED DESCRIPTION

Figure 2B:
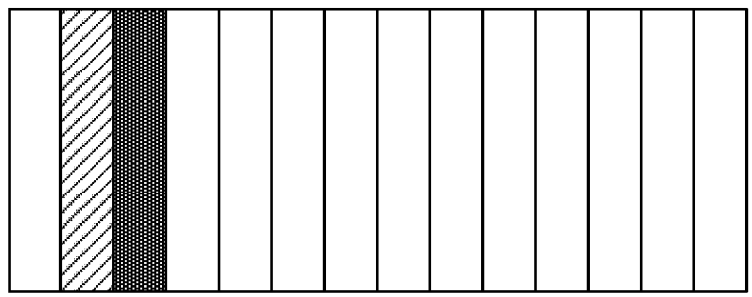
FIG. 2B is a schematic diagram of a mapping of a first demodulation signal, a second demodulation signal, and uplink data in the embodiment corresponding to FIG. 2A.

The technical solutions in the embodiments of the present application will be described below with reference to the accompanying drawings in the embodiments of the present application. Obviously, the described embodiments are part of the embodiments of the present application, but not all of the embodiments. Based on the embodiments in the present application, all other embodiments obtained by a person of ordinary skill in the art without creative efforts shall fall within the protection scope of the present application.

The technical solutions according to the embodiments of the present application may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

The technical solutions according to the embodiments of the present application may be applied to a licensed spectrum or an unlicensed spectrum, which is not particularly limited in the embodiments of the present application.

Exemplarily, a communication system 100 applied in an embodiment of the present invention is shown in FIG. 1. The communication system 100 may include a network device 110. The network device 110 may be a device communicating with user equipment (UE) 120 (or referred to as a communication terminal or a terminal). The network device 110 may provide communication coverage to a specific geographic region, and may communicate with UE located within the coverage region. Optionally, the network device 110 may be a base transceiver station (BTS) in a global system for mobile communications (GSM) or a code division multiple access (CDMA) system, or a nodeB (NB) in a wideband code division multiple access (WCDMA) system, or an evolutional node B (eNB or eNodeB) in a long term evolution (LTE) system, or a radio controller in a cloud radio access network (CRAN). Or, the network device may be a mobile switching center, a relay station, an access point, a vehicle device, a wearable device, a concentrator, a switchboard, a network bridge, a router, a network-side device in a 5th generation (5G) network, or a network device in a public land mobile network (PLMN) that will be evolved in the future, and the like.

The communication system 100 further includes at least one UE 120 located within a coverage range of the network device 110. The "UE" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another UE, which is configured to receive/transmit a communication signal; and/or an Internet of things (IoT) device. The UE configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The UE may refer to an access terminal, UE, a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, UE in a 5G network, or UE in the PLMN that will be evolved in the future, and the like.

Optionally, device to device (D2D) communication may be realized among the UE 120.

Optionally, a 5G system or 5G network may also be referred to as a new radio (NR) system or NR network.

FIG. 1 exemplarily illustrates one network device and two UEs. Optionally, the communication system 100 may include a plurality of network devices, and a coverage range of each network device may include other numbers of UEs, which is not limited by the embodiment of the present invention.

Optionally, the communication system 100 may also include other network entities such as a network controller and a mobile management entity, which is not limited by the embodiment of the present invention.

It should be understood that a device having a communication function in a network/system in the embodiment of the present invention may be referred to as a communication device. The communication system 100 shown in FIG. 1 is taken as an example. The communication device may include a network device 110 and UE 120 which have communication functions. The network device 110 and the UE 120 may be the above-mentioned specific devices, and descriptions thereof are omitted here. The communication device may also include other devices in the communication system 100, such as other network entities including the network controller, the mobile management entity, and the like, which is not limited by the embodiment of the present invention.

It should be understood that the terms "system" and "network" herein may often be interchanged herein. The term "and/or" herein is only an association relationship that describes associated objects, and represents that there may be three relationships. For example, A and/or B may represent that: A exists alone, A and B exist simultaneously, and B exists alone. In addition, the character "/" herein generally indicates that front and back associated objects are in an "or" relationship.

FIG. 2A is a schematic flowchart of an uplink signal transmission method 200 provided by an embodiment of the present application. As shown in FIG. 2A:

in 210, a terminal device transmits a first demodulation signal and uplink data that is obtained by rate matching of a first transmission block to a network device on a first time unit of an unlicensed spectrum, and the first demodulation signal is used for demodulating the uplink data, and symbols occupied by the first demodulation signal do not include a first symbol.

It can be understood that the first time unit may be a time slot, for example, the first time unit may include 14 symbols; or may also be a sub time slot (one sub time slot includes N symbols, where N is an integer greater than or equal to 2 and less than 14). For example, the first time unit may include 7 symbols; or may be a set of multiple time slots, for example, the first time unit may include a set of 12 time slots; or may also be a set of multiple sub time slots, for example, the first time unit may include a set of 2 sub time slots, where one sub time slot includes 4 symbols, another sub time slot includes 7 symbols, and so on, which is not particularly limited in this embodiment.

The first symbol may include but is not limited to at least one of a first one of the symbols in the first time unit and a last one of the symbols in the first time unit, which is not particularly limited in this embodiment.

The first time unit being a time slot including 14 symbols is taken as an example. The symbols are numbered from 0, that is, one time slot includes symbol 0, symbol 1, . . . , symbol 13, and the first symbol may include at least one of the symbol 0 and symbols 13.

Optionally, in a possible implementation of this embodiment, the terminal device may further send a second demodulation signal to the network device on the first time unit. The second demodulation signal is used for demodulating the uplink data, and the symbol occupied by the second demodulation signal does not include the first symbol.

In a specific implementation process, the first demodulation signal may include a demodulation reference signal (DMRS), and the second demodulation signal may include uplink control information (UCI), or the first demodulation signal may include UCI, and the second demodulation signal may include DMRS, which is not particularly limited in this embodiment.

In another specific implementation process, the symbol occupied by the second demodulation signal may further not include the symbol occupied by the first demodulation signal.

It should be understood that, in the embodiments of the present application, the demodulation signal occupying a certain symbol may mean that the demodulation signal is transmitted by all or a portion of resources on the symbol, which is not particularly limited in this embodiment.

In another specific implementation process, the symbol occupied by the second demodulation signal may further include the symbol occupied by the first demodulation signal, that is, the first demodulation signal is transmitted by a portion of resources on the symbol, and the second demodulation signal is also transmitted by a portion of resources on the symbol.

In another specific implementation process, the symbol occupied by the second demodulation signal may be specifically determined according to the symbol occupied by the first demodulation signal.

For example, the symbol occupied by the second demodulation signal may include a first symbol after the symbol occupied by the first demodulation signal. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, and the symbol occupied by the second demodulation signal may include symbol 2, as shown in FIG. 2B.

Figure 2C:
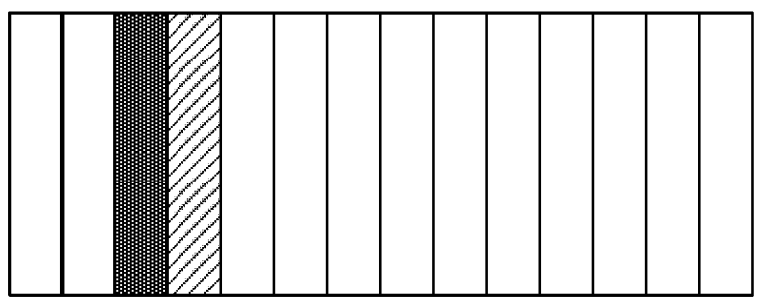
FIG. 2C is a schematic diagram of a mapping of a first demodulation signal, a second demodulation signal, and uplink data in the embodiment corresponding to FIG. 2A.

Alternatively, for another example, the symbol occupied by the second demodulation signal may include a last symbol before the symbol occupied by the first demodulation signal. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 3, and the symbol occupied by the second demodulation signal may include symbol 2, as shown in FIG. 2C.

Alternatively, for still another example, the second demodulation signal occupies multiple symbols, and a first symbol of the symbols occupied by the second demodulation signal is the first symbol after the symbol occupied by the first demodulation signal. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, and the first symbol of the symbols occupied by the second demodulation signal may be symbol 2.

Alternatively, for still another example, the first demodulation signal occupies multiple symbols, and the symbols occupied by the second demodulation signal include a first symbol after the first symbol occupied by the first demodulation signal. The first time unit being a time slot including 14 symbols is taken as an example. The symbols are numbered from 0, that is, one time slot includes symbol 0, symbol 1, . . . , symbol 13. If the first symbol is symbol 0, and the symbols occupied by the first demodulation signal are symbol 1 and symbol 8, and the symbols occupied by the second demodulation signal may include symbol 2.

In some situations, for example, in order to leave an LBT detection gap for the terminal device and other communication devices being capable of performing multiplex transmission on the unlicensed spectrum, the terminal device cannot perform the transmission on a portion of the time-domain resources pre-configured by the network device, for example, symbols in special positions such as a first one of the symbols in one time slot (i.e., symbol 0) and a last one of the symbols in one time slot (i.e., symbol 13). Therefore, on the unlicensed spectrum, by adopting a mapping configuration of the first demodulation signal, the second demodulation signal and the uplink data provided in this embodiment, it can avoid the demodulation signal used for demodulating the uplink data occupies the portion of the pre-configured resources by the network device on which the terminal device cannot perform the transmission, thereby realizing correct transmission of the demodulation signal used for demodulating the uplink data on the unlicensed spectrum.

In an example where the first demodulation signal being DMRS and the second demodulation signal being UCI, it is assumed that the symbol occupied by DMRS is symbol 1 and the symbol occupied by UCI is symbol 2. The resources occupied by the uplink data include other resources in the time slot not occupied by DMRS and UCI.

Figure 2D:
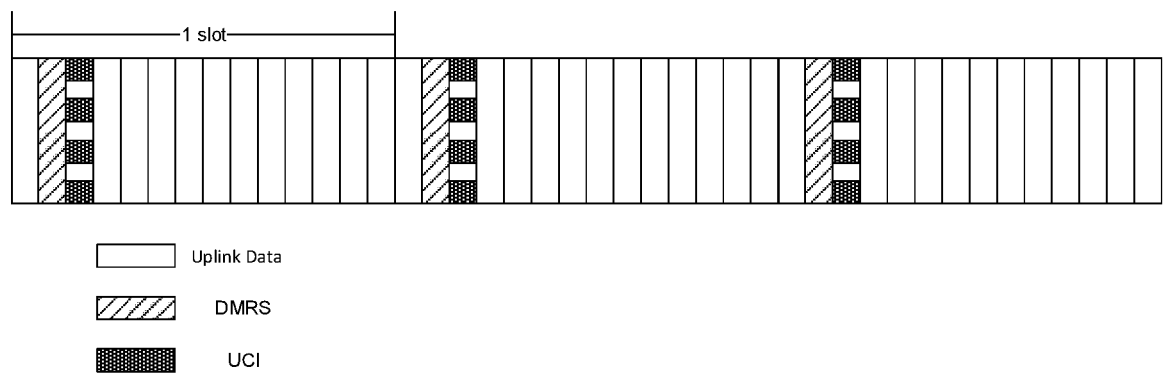
FIG. 2D is a schematic diagram of a mapping of a first demodulation signal, a second demodulation signal, and uplink data in the embodiment corresponding to FIG. 2A.

According to the above principle, a mapping method in which transmission of physical uplink shared channel (PUSCH) of the configure grant uplink is performed in three consecutive time slots and a complete slot is transmitted during each slot can be shown in FIG. 2D.

Figure 2E:
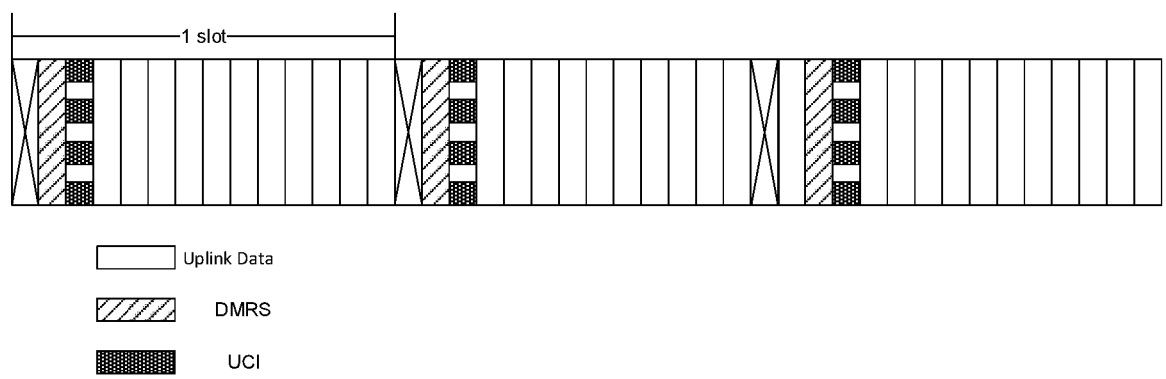
FIG. 2E is a schematic diagram of a mapping of a first demodulation signal, a second demodulation signal, and uplink data in the embodiment corresponding to FIG. 2A.

According to the above principle, the mapping method in which the transmission of PUSCH of the configure grant uplink is performed in three consecutive time slots and some symbols in the three consecutive time slots may not be transmitted (for example, the first time slot does not transmit the symbol 0, the second time slot does not transmit the symbol 0 and the symbol 13) can be shown in FIG. 2E, where X indicates no transmission.

As shown in FIGS. 2D and 2E, in the above two uplink transmission processes, positions of DMRS and UCI are located on the symbols that cannot be discarded, thereby ensuring the correct transmission of the demodulation signal used for demodulating uplink data on the unlicensed spectrum.

In another specific implementation process, the symbol occupied by the first demodulation signal may be specified by a standard specification.

For example, the symbol occupied by the first demodulation signal may specifically include a second one of the symbols in the first time unit.

In another specific implementation process, the symbol occupied by the first demodulation signal may be transmitted by the network device to the terminal device through indication information.

The indication information may be a physical layer signaling, or may also be a media access control (MAC) control element (CE) signaling, or may be a radio resource control (RRC) signaling, which is not particularly limited in this embodiment.

When the indication information is the physical layer signaling, the indication information may be indicated in an explicit manner or in as implicit manner.

For example, the network device indicates to the terminal device the symbol occupied by the first demodulation signal (or the first symbol occupied by the first demodulation signal, or the last symbol occupied by the first demodulation signal) by downlink control information (DCI). The DCI further includes information that the network device indicates that the terminal device can use or be prohibited the use of the first time unit.

Alternatively, for another example, DCI format 1 corresponds to a symbol occupied by the first demodulation signal (for example, the first demodulation signal occupies symbol 3), and DCI format 2 corresponds to another symbol occupied by the first demodulation signal (for example, the first demodulation signal occupies symbol 5). When the terminal device receives the DCI format 1, it can determine that the symbols occupied by the first demodulation signal include symbol 3; when the terminal device receives the DCI format 2, it can determine that the symbols occupied by the first demodulation signal include symbol 5.

It can be understood that the indication information may also be a combination of RRC signaling and physical layer signaling. For example, the network device configures at least two configurations of symbols occupied by the first demodulation signal, and indicates to the terminal device which of the at least two configurations should be used in one uplink transmission through DCI.

Optionally, in the embodiments of the present application, the UCI may include control information used for demodulating the uplink data. Therefore, the UCI may also be considered as a demodulation signal necessary for demodulating the uplink data.

The UCI may include but not limited to at least one piece of the following information:

a hybrid automatic repeat request (HARQ) identifier corresponding to the first transmission block, an identifier of the terminal device, a starting symbol of the first time unit, and an ending symbol of the first time unit and an indication of a code block group (CBG) included in the first transmission block.

For example, a starting position of the uplink data mapped on the first time unit may include the first one of the symbols in the first time unit. In this way, the mapping of the uplink data starts from the first one of the symbols in the first time unit, and ends with the last one of the symbols in the first time unit. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 0, and ends with symbol 13, as shown in FIG. 2F. The mapping method is simple.

Alternatively, for another example, the starting position of the uplink data mapped on the first time unit may include a symbol other than the first one of the symbols in the first time unit, and the uplink data is not mapped on the first one of the symbols in the first time unit. In this way, the mapping of the uplink data starts from the symbol other than the first one of the symbols in the first time unit, and ends with the last one of the symbols in the first time unit. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 3, and ends with symbol 13, and the uplink data is not mapped on symbol 0, as shown in FIG. 2G.

Alternatively, for still another example, the ending position of the uplink data mapped on the first time unit may include the first one of the symbols in the first time unit. In this way, the mapping of the uplink data starts from the first one of the symbols in the first time unit, and ends by returning to the first symbol after reaching the last symbol. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 3, and ends by returning to symbol 0 after reaching symbol 13, as shown in FIG. 2H. Although the mapping method is complex, but it can guarantee the transmission of the system information of the uplink data.

In this embodiment, the terminal device transmits the first demodulation signal and the uplink data that is obtained by rate matching of a first transmission block to the network device on the first time unit of the unlicensed spectrum, and the first demodulation signal is used for demodulating the uplink data, symbols occupied by the first demodulation signal do not include a first symbol; and the first symbol includes at least one of a first one of the symbols in the first time unit and a last one of the symbols in the first time unit. Accordingly, the technical solutions in the present application can avoid the demodulation signal used for demodulating the uplink data occupies the portion of the pre-configured resources by the network device on which the terminal device cannot perform the transmission, thereby realizing correct transmission of the demodulation signal used for demodulating the uplink data on the unlicensed spectrum.

FIG. 3 is a schematic flowchart of another uplink signal transmission method 300 provided by an embodiment of the present application. As shown in FIG. 3:

in 310, a network device receives a first demodulation signal and uplink data that is obtained by rate matching of a first transmission block transmitted by a terminal device on a first time unit of an unlicensed spectrum, and the first demodulation signal is used for demodulating the uplink data, and symbols occupied by the first demodulation signal do not include a first symbol.

It can be understood that the first time unit may be a time slot, for example, the first time unit may include 14 symbols; or may also be a sub time slot (one sub time slot includes N symbols, where N is an integer greater than or equal to 2 and less than 14). For example, the first time unit may include 7 symbols; or may be a set of multiple time slots, for example, the first time unit may include a set of 12 time slots; or may also be a set of multiple sub time slots, for example, the first time unit may include a set of 2 sub time slots, where one sub time slot includes 4 symbols, another sub time slot includes 7 symbols, and so on, which is not particularly limited in this embodiment.

The first symbol may include but is not limited to at least one of a first one of the symbols in the first time unit and a last one of the symbols in the first time unit, which is not particularly limited in this embodiment.

The first time unit being a time slot including 14 symbols is taken as an example. The symbols are numbered from 0, that is, one time slot includes symbol 0, symbol 1, . . . , symbol 13, and the first symbol may include at least one of the symbol 0 and symbols 13.

Optionally, in a possible implementation of this embodiment, the network device may further receive a second demodulation signal transmitted by the terminal device on the first time unit. The second demodulation signal is used for demodulating the uplink data, and the symbol occupied by the second demodulation signal does not include the first symbol.

In a specific implementation process, the first demodulation signal may include a demodulation reference signal (DMRS), and the second demodulation signal may include uplink control information (UCI), or the first demodulation signal may include UCI, and the second demodulation signal may include DMRS, which is not particularly limited in this embodiment.

In another specific implementation process, the symbol occupied by the second demodulation signal may further not include the symbol occupied by the first demodulation signal.

It should be understood that, in the embodiments of the present application, the demodulation signal occupying a certain symbol may mean that the demodulation signal is transmitted by all or a portion of resources on the symbol, which is not particularly limited in this embodiment.

In another specific implementation process, the symbol occupied by the second demodulation signal may further include the symbol occupied by the first demodulation signal, that is, the first demodulation signal is transmitted by a portion of resources on the symbol, and the second demodulation signal is also transmitted by a portion of resources on the symbol.

In another specific implementation process, the symbol occupied by the second demodulation signal may be specifically determined according to the symbol occupied by the first demodulation signal.

For example, the symbol occupied by the second demodulation signal may include a first symbol after the symbol occupied by the first demodulation signal. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, and the symbol occupied by the second demodulation signal may include symbol 2, as shown in FIG. 2B.

Alternatively, for another example, the symbol occupied by the second demodulation signal may include a last symbol before the symbol occupied by the first demodulation signal. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 3, and the symbol occupied by the second demodulation signal may include symbol 2, as shown in FIG. 2C.

Alternatively, for still another example, the second demodulation signal occupies multiple symbols, and a first symbol of the symbols occupied by the second demodulation signal is the first symbol after the symbol occupied by the first demodulation signal. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, and the first symbol of the symbols occupied by the second demodulation signal may be symbol 2.

Alternatively, for still another example, the first demodulation signal occupies multiple symbols, and the symbols occupied by the second demodulation signal include a first symbol after the first symbol occupied by the first demodulation signal. The first time unit being a time slot including 14 symbols is taken as an example. The symbols are numbered from 0, that is, one time slot includes symbol 0, symbol 1, . . . , symbol 13. If the first symbol is symbol 0, and the symbols occupied by the first demodulation signal are symbol 1 and symbol 8, and the symbols occupied by the second demodulation signal may include symbol 2.

In some situations, for example, in order to leave an LBT detection gap for the terminal device and other communication devices being capable of performing multiplex transmission on the unlicensed spectrum, the terminal device cannot perform the transmission on a portion of the time-domain resources pre-configured by the network device, for example, symbols in special positions such as a first one of the symbols in one time slot (i.e., symbol 0) and a last one of the symbols in one time slot (i.e., symbol 13). Therefore, on the unlicensed spectrum, by adopting a mapping configuration of the first demodulation signal, the second demodulation signal and the uplink data provided in this embodiment, it can avoid the demodulation signal used for demodulating the uplink data occupies the portion of the pre-configured resources by the network device on which the terminal device cannot perform the transmission, thereby realizing correct transmission of the demodulation signal used for demodulating the uplink data on the unlicensed spectrum.

In an example where the first demodulation signal being DMRS and the second demodulation signal being UCI, it is assumed that the symbol occupied by DMRS is symbol 1 and the symbol occupied by UCI is symbol 2. The resources occupied by the uplink data include other resources in the time slot not occupied by DMRS and UCI.

According to the above principle, a mapping method in which transmission of physical uplink shared channel (PUSCH) of the configure grant uplink is performed in three consecutive time slots and a complete slot is transmitted during each slot can be shown in FIG. 2D.

According to the above principle, the mapping method in which the transmission of PUSCH of the configure grant uplink is performed in three consecutive time slots and some symbols in the three consecutive time slots may not be transmitted (for example, the first time slot does not transmit the symbol 0, the second time slot does not transmit the symbol 0 and the symbol 13) can be shown in FIG. 2E, where X indicates no transmission.

As shown in FIGS. 2D and 2E, in the above two uplink transmission processes, positions of DMRS and UCI are located on the symbols that cannot be discarded, thereby ensuring the correct transmission of the demodulation signal used for demodulating uplink data on the unlicensed spectrum.

In another specific implementation process, the symbol occupied by the first demodulation signal may be specified by a standard specification.

For example, the symbol occupied by the first demodulation signal may specifically include a second one of the symbols in the first time unit.

In another specific implementation process, the symbol occupied by the first demodulation signal may be transmitted by the network device to the terminal device through indication information.

The indication information may be a physical layer signaling, or may also be a media access control (MAC) control element (CE) signaling, or may be a radio resource control (RRC) signaling, which is not particularly limited in this embodiment.

When the indication information is the physical layer signaling, the indication information may be indicated in an explicit manner or in as implicit manner.

For example, the network device indicates to the terminal device the symbol occupied by the first demodulation signal (or the first symbol occupied by the first demodulation signal, or the last symbol occupied by the first demodulation signal) by downlink control information (DCI). The DCI further includes information that the network device indicates that the terminal device can use or be prohibited the use of the first time unit.

Alternatively, for another example, DCI format 1 corresponds to a symbol occupied by the first demodulation signal (for example, the first demodulation signal occupies symbol 3), and DCI format 2 corresponds to another symbol occupied by the first demodulation signal (for example, the first demodulation signal occupies symbol 5). When the terminal device receives the DCI format 1, it can determine that the symbols occupied by the first demodulation signal include symbol 3; when the terminal device receives the DCI format 2, it can determine that the symbols occupied by the first demodulation signal include symbol 5.

It can be understood that the indication information may also be a combination of RRC signaling and physical layer signaling. For example, the network device configures at least two configurations of symbols occupied by the first demodulation signal, and indicates to the terminal device which of the at least two configurations should be used in one uplink transmission through DCI.

Optionally, in the embodiments of the present application, the UCI may include control information used for demodulating the uplink data. Therefore, the UCI may also be considered as a demodulation signal necessary for demodulating the uplink data.

The UCI may include but not limited to at least one piece of the following information:

a hybrid automatic repeat request (HARQ) identifier corresponding to the first transmission block, an identifier of the terminal device, a starting symbol of the first time unit, and an ending symbol of the first time unit and an indication of a code block group (CBG) included in the first transmission block.

For example, a starting position of the uplink data mapped on the first time unit may include the first one of the symbols in the first time unit. In this way, the mapping of the uplink data starts from the first one of the symbols in the first time unit, and ends with the last one of the symbols in the first time unit. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 0, and ends with symbol 13, as shown in FIG. 2F. The mapping method is simple.

Alternatively, for another example, the starting position of the uplink data mapped on the first time unit may include a symbol other than the first one of the symbols in the first time unit, and the uplink data is not mapped on the first one of the symbols in the first time unit. In this way, the mapping of the uplink data starts from the symbol other than the first one of the symbols in the first time unit, and ends with the last one of the symbols in the first time unit. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 3, and ends with symbol 13, and the uplink data is not mapped on symbol 0, as shown in FIG. 2G.

Alternatively, for still another example, the ending position of the uplink data mapped on the first time unit may include the first one of the symbols in the first time unit. In this way, the mapping of the uplink data starts from the first one of the symbols in the first time unit, and ends by returning to the first symbol after reaching the last symbol. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 3, and ends by returning to symbol 0 after reaching symbol 13, as shown in FIG. 2H. Although the mapping method is complex, but it can guarantee the transmission of the system information of the uplink data.

In this embodiment, the network device receives the first demodulation signal and the uplink data that is obtained by rate matching of a first transmission block transmitted by the terminal device on the first time unit of the unlicensed spectrum, and the first demodulation signal is used for demodulating the uplink data, symbols occupied by the first demodulation signal do not include a first symbol; and the first symbol includes at least one of a first one of the symbols in the first time unit and a last one of the symbols in the first time unit. Accordingly, the technical solutions in the present application can avoid the demodulation signal used for demodulating the uplink data occupies the portion of the pre-configured resources by the network device on which the terminal device cannot perform the transmission, thereby realizing correct transmission of the demodulation signal used for demodulating the uplink data on the unlicensed spectrum.

Figure 4:
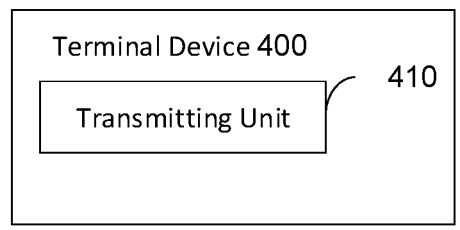
FIG. 4 is a schematic block diagram of a terminal device provided by an embodiment of the present application.

FIG. 4 is a schematic block diagram of a terminal device 400 provided by an embodiment of the present application. As shown in FIG. 4, this embodiment provides a terminal device 400 configured to the method in the embodiment corresponding to FIG. 2A.

Specifically, the terminal device 400 includes functional modules configured to the method in the embodiment corresponding to FIG. 2A. The terminal device 400 may include a transmitting unit 410, configured to transmit a first demodulation signal and uplink data that is obtained by rate matching of a first transmission block to a network device on a first time unit of an unlicensed spectrum, and the first demodulation signal is used for demodulating the uplink data, and symbols occupied by the first demodulation signal do not include a first symbol;

the first symbol includes at least one of a first one of the symbols in the first time unit and a last one of the symbols in the first time unit, which is not particularly limited in this embodiment.

Optionally, in a possible implementation of this embodiment, the transmitting unit 410 may be further configured to transmit a second demodulation signal to the network device on the first time unit. The second demodulation signal is used for demodulating the uplink data, and the symbol occupied by the second demodulation signal does not include the first symbol.

In a specific implementation process, the symbol occupied by the second demodulation signal may further not include the symbol occupied by the first demodulation signal.

In another specific implementation process, the symbol occupied by the second demodulation signal may further include the symbol occupied by the first demodulation signal, that is, the first demodulation signal is transmitted by a portion of resources on the symbol, and the second demodulation signal is also transmitted by a portion of resources on the symbol.

In another specific implementation process, the symbol occupied by the second demodulation signal may be specifically determined according to the symbol occupied by the first demodulation signal.

In another specific implementation process, the symbol occupied by the first demodulation signal may be specified by a standard specification.

For example, the symbol occupied by the first demodulation signal may specifically include a second one of the symbols in the first time unit.

In another specific implementation process, the symbol occupied by the first demodulation signal may be transmitted by the network device to the terminal device through indication information.

The indication information may be a physical layer signaling, or may also be a media access control (MAC) control element (CE) signaling, or may be a radio resource control (RRC) signaling, which is not particularly limited in this embodiment.

It can be understood that the indication information may also be a combination of RRC signaling and physical layer signaling. For example, the network device configures at least two configurations of symbols occupied by the first demodulation signal, and indicates to the terminal device which of the at least two configurations should be used in one uplink transmission through DCI.

In another specific implementation process, the first demodulation signal may include a demodulation reference signal (DMRS), and the second demodulation signal may include uplink control information (UCI), or the first demodulation signal may include UCI, and the second demodulation signal may include DMRS, which is not particularly limited in this embodiment.

Optionally, in the embodiments of the present application, the UCI may include control information used for demodulating the uplink data. Therefore, the UCI may also be considered as a demodulation signal necessary for demodulating the uplink data.

The UCI may include but not limited to at least one piece of the following information:

a hybrid automatic repeat request (HARQ) identifier corresponding to the first transmission block, an identifier of the terminal device, a starting symbol of the first time unit, and an ending symbol of the first time unit and an indication of a code block group (CBG) included in the first transmission block.

For example, a starting position of the uplink data mapped on the first time unit may include the first one of the symbols in the first time unit. In this way, the mapping of the uplink data starts from the first one of the symbols in the first time unit, and ends with the last one of the symbols in the first time unit. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 0, and ends with symbol 13, and the mapping method is simple.

Alternatively, for another example, the starting position of the uplink data mapped on the first time unit may include a symbol other than the first one of the symbols in the first time unit, and the uplink data is not mapped on the first one of the symbols in the first time unit. In this way, the mapping of the uplink data starts from the symbol other than the first one of the symbols in the first time unit, and ends with the last one of the symbols in the first time unit. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 3, and ends with symbol 13, and the uplink data is not mapped on symbol 0.

Alternatively, for still another example, the ending position of the uplink data mapped on the first time unit may include the first one of the symbols in the first time unit. In this way, the mapping of the uplink data starts from the first one of the symbols in the first time unit, and ends by returning to the first symbol after reaching the last symbol. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 3, and ends by returning to symbol 0 after reaching symbol 13. Although the mapping method is complex, but it can guarantee the transmission of the system information of the uplink data.

Figure 5:
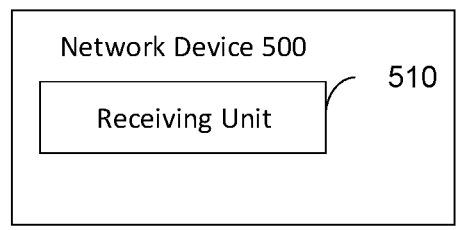
FIG. 5 is a schematic block diagram of a network device provided by an embodiment of the present application.

FIG. 5 is a schematic block diagram of a network device 500 provided by an embodiment of the present application. As shown in FIG. 5, this embodiment provides a network device configured to the method in the embodiment corresponding to FIG. 3.

Specifically, the network device 500 includes functional modules configured to the method in the embodiment corresponding to FIG. 3. The network device 500 may include a receiving unit 510, configured to receive a first demodulation signal and uplink data that is obtained by rate matching of a first transmission block transmitted by a terminal device on a first time unit of an unlicensed spectrum, and the first demodulation signal is used for demodulating the uplink data, and symbols occupied by the first demodulation signal do not include a first symbol;

the first symbol includes at least one of a first one of the symbols in the first time unit and a last one of the symbols in the first time unit, which is not particularly limited in this embodiment.

Optionally, in a possible implementation of this embodiment, the receiving unit 510 may be further configured to receive a second demodulation signal transmitted by the terminal device on the first time unit. The second demodulation signal is used for demodulating the uplink data, and the symbol occupied by the second demodulation signal does not include the first symbol.

In a specific implementation process, the symbol occupied by the second demodulation signal may further not include the symbol occupied by the first demodulation signal.

In another specific implementation process, the symbol occupied by the second demodulation signal may further include the symbol occupied by the first demodulation signal, that is, the first demodulation signal is transmitted by a portion of resources on the symbol, and the second demodulation signal is also transmitted by a portion of resources on the symbol.

In another specific implementation process, the symbol occupied by the second demodulation signal may be specifically determined according to the symbol occupied by the first demodulation signal.

In another specific implementation process, the symbol occupied by the first demodulation signal may be specified by a standard specification.

For example, the symbol occupied by the first demodulation signal may specifically include a second one of the symbols in the first time unit.

In another specific implementation process, the symbol occupied by the first demodulation signal may be transmitted by the network device to the terminal device through indication information.

The indication information may be a physical layer signaling, or may also be a media access control (MAC) control element (CE) signaling, or may be a radio resource control (RRC) signaling, which is not particularly limited in this embodiment.

It can be understood that the indication information may also be a combination of RRC signaling and physical layer signaling. For example, the network device configures at least two configurations of symbols occupied by the first demodulation signal, and indicates to the terminal device which of the at least two configurations should be used in one uplink transmission through DCI.

In another specific implementation process, the first demodulation signal may include a demodulation reference signal (DMRS), and the second demodulation signal may include uplink control information (UCI), or the first demodulation signal may include UCI, and the second demodulation signal may include DMRS, which is not particularly limited in this embodiment.

Optionally, in the embodiments of the present application, the UCI may include control information used for demodulating the uplink data. Therefore, the UCI may also be considered as a demodulation signal necessary for demodulating the uplink data.

The UCI may include but not limited to at least one piece of the following information:

a hybrid automatic repeat request (HARQ) identifier corresponding to the first transmission block, an identifier of the terminal device, a starting symbol of the first time unit, and an ending symbol of the first time unit and an indication of a code block group (CBG) included in the first transmission block.

For example, a starting position of the uplink data mapped on the first time unit may include the first one of the symbols in the first time unit. In this way, the mapping of the uplink data starts from the first one of the symbols in the first time unit, and ends with the last one of the symbols in the first time unit. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 0, and ends with symbol 13, and the mapping method is simple.

Alternatively, for another example, the starting position of the uplink data mapped on the first time unit may include a symbol other than the first one of the symbols in the first time unit, and the uplink data is not mapped on the first one of the symbols in the first time unit. In this way, the mapping of the uplink data starts from the symbol other than the first one of the symbols in the first time unit, and ends with the last one of the symbols in the first time unit. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 3, and ends with symbol 13, and the uplink data is not mapped on symbol 0.

Alternatively, for still another example, the ending position of the uplink data mapped on the first time unit may include the first one of the symbols in the first time unit. In this way, the mapping of the uplink data starts from the first one of the symbols in the first time unit, and ends by returning to the first symbol after reaching the last symbol. The first time unit being a time slot including 14 symbols is taken as an example. The symbols are numbered from 0, that is, one time slot includes symbol 0, symbol 1, . . . , symbol 13. If the first symbol is symbol 0, and the symbol occupied by the first demodulation signal is symbol 1, the symbols occupied by the second demodulation signal may include symbol 2. Then, on the symbols 0, 3 to 13, the mapping of the uplink data starts from symbol 3, and ends by returning to symbol 0 after reaching symbol 13. Although the mapping method is complex, but it can guarantee the transmission of the system information of the uplink data.

Figure 6:
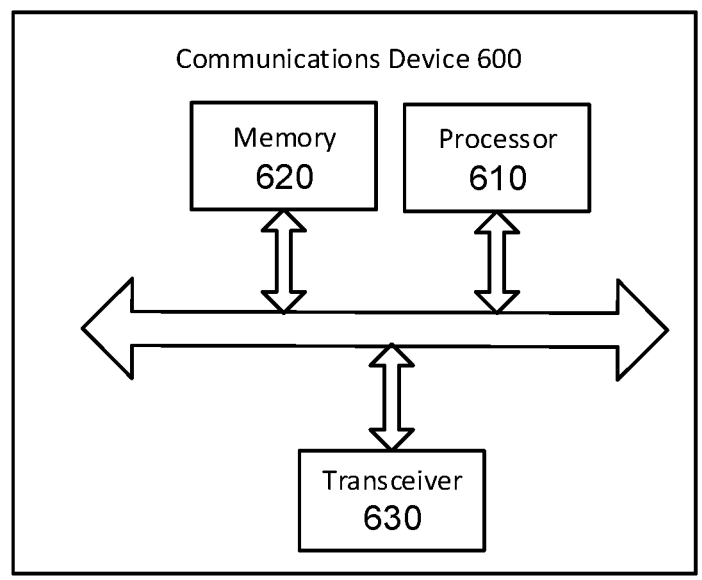
FIG. 6 is a schematic block diagram of a communication device according to an embodiment of the present application.

FIG. 6 is a schematic structural diagram of a communications device 600 according to an embodiment of the present application. The communications device 600 shown in FIG. 6 includes a processor 610. The processor 610 may invoke a computer program from a memory and run the computer program, to implement the method in the embodiments of the present application.

Optionally, as shown in FIG. 6, the communications device 600 may further include a memory 620. The processor 610 may invoke the computer program from the memory 620 and run the computer program, to implement the method in the embodiments of the present application.

The memory 620 may be a component independent of the processor 610, or may be integrated into the processor 610.

Optionally, as shown in FIG. 6, the communications device 600 may further include a transceiver 630. The processor 610 may control the transceiver 630 to communicate with another device, and specifically, the transceiver 630 may send information or data to another device, or receive information or data sent by another device.

The transceiver 630 may include a transmitter and a receiver. The transceiver 630 may further include an antenna. There may be one or more antennas.

Optionally, the communications device 600 may be the network device in the embodiments of the present application, and the communications device 600 can implement corresponding procedures implemented by the network device in various methods in the embodiments of the present application. For brevity, details are not described herein again.

Optionally, the communications device 600 may be the terminal device in the embodiments of the present application, and the communications device 600 can implement corresponding procedures implemented by the terminal device in various methods in the embodiments of the present application. For brevity, details are not described herein again.

Figure 7:
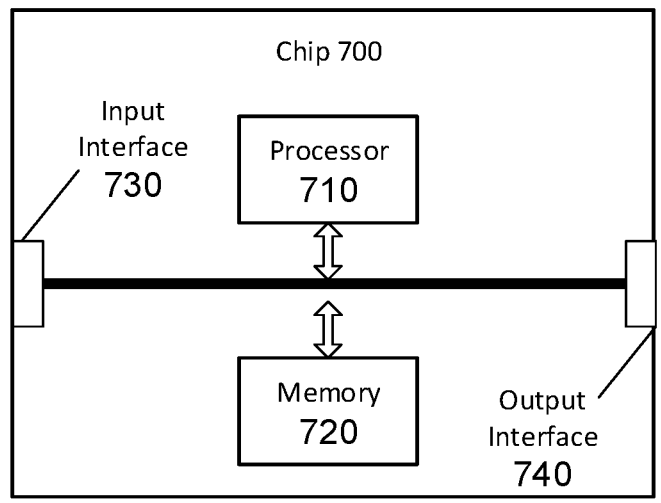
FIG. 7 is a schematic block diagram of a chip provided by an embodiment of the present application.

FIG. 7 is a schematic structural diagram of a chip 700 according to an embodiment of the present application. The chip 700 shown in FIG. 7 includes a processor 710. The processor 710 may invoke a computer program from a memory and run the computer program, to implement the method in the embodiments of the present application.

Optionally, as shown in FIG. 7, the chip 700 may further include a memory 720. The processor 710 may invoke the computer program from the memory 720 and run the computer program, to implement the method in the embodiments of the present application.

The memory 720 may be a component independent of the processor 710, or may be integrated into the processor 710.

Optionally, the chip 700 may further include an input interface 730. The processor 710 may control the input interface 730 to communicate with another device or chip, and specifically, the input interface 730 may obtain information or data sent by another device or chip.

Optionally, the chip 700 may further include an output interface 740. The processor 710 may control the output interface 740 to communicate with another device or chip, and specifically, the output interface 740 may output information or data to another device or chip Optionally, the chip may be applied to the network device in the embodiments of the present application, and the chip can implement corresponding procedures implemented by the network device in various methods in the embodiments of the present application. For brevity, details are not described herein again.

Optionally, the chip may be applied to the mobile terminal/terminal device in the embodiments of the present application, and the chip can implement corresponding procedures implemented by the mobile terminal/terminal device in various methods in the embodiments of the present application. For brevity, details are not described herein again.

It should be noted that, the chip mentioned in the embodiments of the present application may also be referred to as a system-level chip, a system chip, a chip system, a system on chip, or the like.

Figure 8:
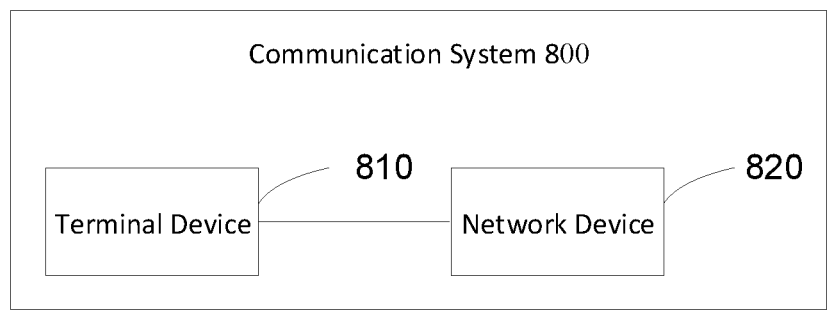
FIG. 8 is a schematic block diagram of a communication system provided by an embodiment of the present application.

FIG. 8 is a schematic structural diagram of a communication system 800 according to an embodiment of the present application. The communication system 800 shown in FIG. 8 includes a terminal device 810 and a network device 820.

The terminal device 810 can implement corresponding functions implemented by the terminal device in the foregoing method and the network device 820 can implement corresponding functions implemented by the network device in the foregoing method. For brevity, details are not described herein again.

It should be understood that, the processor of the embodiments of the present application may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present invention may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that, the memory in the embodiments of the present application may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synclink dynamic random access memory (SLDRAM), and a direct Rambus random access memory (DRRAM). It should be noted that, the memory of the system and the method described in this embodiment of the present application is intended to include but is not limited to these memories and any other suitable type of memory.

It should be understood that, the memory is an example but is not intended for limitation. For example, the memory in the embodiments of the present application may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct Rambus RAM (DR RAM), and the like. That is, the memory described in this embodiment of the present application is intended to include but is not limited to these memories and any other suitable type of memory.

An embodiment of the present application further provides a computer readable storage medium. The computer readable storage medium is configured to store a computer program.

Optionally, the computer readable storage medium may be applied to the network device in the embodiments of the present application, and the computer program enables a computer to execute a corresponding procedure implemented by the network device in the methods of the embodiments of the present application. For brevity, details are not described herein again.

Optionally, the computer readable storage medium may be applied to the terminal device in the embodiments of the present application, and the computer program enables the computer to execute a corresponding procedure implemented by the terminal device in the methods of the embodiments of the present application. For brevity, details are not described herein again.

The present application further provides a computer program product. The computer program product includes a computer program instruction.

Optionally, the computer program product may be applied to the network device in the embodiments of the present application, and the computer program instruction enables the computer to execute a corresponding procedure implemented by the network device in the methods of the embodiments of the present application. For brevity, details are not described herein again.

Optionally, the computer program product may be applied to the terminal device in the embodiments of the present application, and the computer program instruction enables the computer to execute a corresponding procedure implemented by the terminal device in the methods of the embodiments of the present application. For brevity, details are not described herein again.

The present application further provides a computer program.

Optionally, the computer program may be applied to the network device in the embodiments of the present application, and when run on a computer, the computer program instruction enables the computer to execute a corresponding procedure implemented by the network device in the methods of the embodiments of the present application. For brevity, details are not described herein again.

Optionally, the computer program may be applied to the terminal device in the embodiments of the present application, and when run on a computer, the computer program instruction enables the computer to execute a corresponding procedure implemented by the terminal device in the methods of the embodiments of the present application. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present application, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present application, but the protection scope of the present application is not limited thereto. Changes or replacements readily figured out by any person skilled in the art within the technical scope disclosed in the present application shall be covered by the protection scope of the present application. Therefore, the protection scope of the present application shall be subject to the protection scope of the claims.

What is claimed is:

1. An uplink signal transmission method, comprising:
   transmitting, by a terminal device to a network device on a first time unit of an unlicensed spectrum, a first demodulation signal and uplink data that is obtained by rate matching of a first transmission block, wherein the first demodulation signal is used for demodulating the uplink data, and symbols occupied by the first demodulation signal do not comprise a first symbol;
   wherein the first symbol comprises a first one of symbols in the first time unit;
   wherein the symbols occupied by the first demodulation signal comprises a second one of the symbols in the first time unit; and
   the first demodulation signal comprises uplink control information (UCI), and the UCI comprises at least one piece of the following information:
   a hybrid automatic repeat request (HARQ) identifier corresponding to the first transmission block, an identifier of the terminal device, a starting symbol of the first time unit, and an ending symbol of the first time unit and an indication of a code block group (CBG) comprised in the first transmission block.

2. The method according to claim 1, wherein the method further comprises:
   transmitting, by the terminal device, a second demodulation signal to the network device on the first time unit, wherein the second demodulation signal is used for demodulating the uplink data, and symbols occupied by the second demodulation signal do not comprise the first symbol.

3. The method according to claim 2, wherein the symbols occupied by the second demodulation signal do not comprise the symbols occupied by the first demodulation signal.

4. The method according to claim 2, wherein the symbols occupied by the second demodulation signal are determined according to the symbols occupied by the first demodulation signal.

5. The method according to claim 1, wherein the symbols occupied by the first demodulation signal are transmitted by the network device to the terminal device by indication information, wherein the indication information is a physical layer signaling or a radio resource control (RRC) signaling.

6. The method according to claim 1, wherein:
   the second demodulation signal comprises a demodulation reference signal (DMRS).

7. The method according to claim 1, wherein:
   a starting position of the uplink data mapped on the first time unit comprises the first one of the symbols in the first time unit; or, an ending position of the uplink data mapped on the first time unit comprises the first one of the symbols in the first time unit.

8. An uplink signal transmission method, comprising:
   receiving, by a network device, a first demodulation signal and uplink data that is obtained by rate matching of a first transmission block and transmitted by a terminal device on a first time unit of an unlicensed spectrum, wherein the first demodulation signal is used for demodulating the uplink data, and symbols occupied by the first demodulation signal do not comprise a first symbol;
   wherein the first symbol comprises a first one of symbols in the first time unit;
   wherein the symbols occupied by the first demodulation signal comprises a second one of the symbols in the first time unit; and
   the first demodulation signal comprises uplink control information (UCI), and the UCI comprises at least one piece of the following information:
   a hybrid automatic repeat request (HARQ) identifier corresponding to the first transmission block, an identifier of the terminal device, a starting symbol of the first time unit, and an ending symbol of the first time unit and an indication of a code block group (CBG) comprised in the first transmission block.

9. The method according to claim 8, wherein the method further comprises:
   receiving, by the network device, a second demodulation signal transmitted by the terminal device on the first time unit, wherein the second demodulation signal is used for demodulating the uplink data, and symbols occupied by the second demodulation signal do not comprise the first symbol.

10. The method according to claim 9, wherein the symbols occupied by the second demodulation signal do not comprise the symbols occupied by the first demodulation signal.

11. The method according to claim 9, wherein the symbols occupied by the second demodulation signal are determined according to the symbols occupied by the first demodulation signal.

12. The method according to claim 8, wherein the symbols occupied by the first demodulation signal are specified by a standard specification.

13. The method according to claim 8, wherein:
the second demodulation signal comprises a demodulation reference signal (DMRS).

14. The method according to claim 8, wherein:
a starting position of the uplink data mapped on the first time unit comprises the first one of the symbols in the first time unit; or, an ending position of the uplink data mapped on the first time unit comprises the first one of the symbols in the first time unit.

15. A terminal device, comprising a processor and a memory, wherein the memory is configured to store a computer program, and the processor is configured to call and run the computer program stored in the memory to implement steps of the method according to claim 1.

16. A network device, comprising a processor and a memory, wherein the memory is configured to store a computer program, and the processor is configured to call and run the computer program stored in the memory to implement the method according to claim 8.

* * * * *